United States Patent [19]

Aosai et al.

[11] Patent Number: 4,985,472
[45] Date of Patent: Jan. 15, 1991

[54] ACTINIC RAY CURABLE COMPOSITION FOR CASTING POLYMERIZATION AND CASTING POLYMERIZATION MOLDED PRODUCTS

[75] Inventors: Fumito Aosai, Nagoya; Hiroshi Fukushima, Kasugai; Hisako Hado, Ogaki, all of Japan

[73] Assignee: Mitsubishi Rayon Company, Ltd., Tokyo, Japan

[21] Appl. No.: 273,338

[22] PCT Filed: Apr. 28, 1988

[86] PCT No.: PCT/JP88/00432
  § 371 Date: Nov. 7, 1988
  § 102(e) Date: Nov. 7, 1988

[87] PCT Pub. No.: WO88/08434
  PCT Pub. Date: Nov. 3, 1988

[30] Foreign Application Priority Data

May 1, 1987 [JP] Japan .................. 62-108662
Jun. 4, 1987 [JP] Japan .................. 62-140521
Jul. 6, 1987 [JP] Japan .................. 62-168493
Dec. 11, 1987 [JP] Japan .................. 62-313267
Feb. 15, 1988 [JP] Japan .................. 63-32564
Feb. 15, 1988 [JP] Japan .................. 63-32565

[51] Int. Cl.$^5$ .................. C08G 18/10
[52] U.S. Cl. .................. 522/64; 522/96; 522/68; 528/59
[58] Field of Search .................. 522/96, 64, 68

[56] References Cited

U.S. PATENT DOCUMENTS 3,553,174 1/1971 Hausslein et al. .
3,907,865 9/1975 Miyata et al. .................. 260/471 C
4,265,723 5/1981 Hess et al. .................. 522/64
4,443,588 4/1984 Fakuda et al. .................. 526/301

FOREIGN PATENT DOCUMENTS 204575 of 1986 European Pat. Off. .
239641 of 1987 European Pat. Off. .
60-163911 of 1985 Japan .
163911 8/1985 Japan .
61-21121 of 1986 Japan .
61-278521 of 1986 Japan .

Primary Examiner—Marion C. McCamish
Assistant Examiner—Susan Berman
Attorney, Agent, or Firm—Oblon, Spivak, McClelland, Maier & Neustadt

[57] ABSTRACT

An actinic ray curable composition for casting polymerization which comprises:
(A) 40–90 parts by weight of an urethane poly(meth)acrylate having at least two (meth)acryloyl groups in one molecule,
(B) 10–60 parts by weight of a radical polymerizable vinyl monomer having a boiling point of 100° C. or higher, and
(C) 0.005–5 parts by weight, per 100 parts by weight of total of the above components (A) and (B), of at least one member selected from methylphenyl glyoxylate, 2-hydroxy-2-methyl-1-phenylpropane-1-one, hydroxycyclohexyl phenyl ketone and a photo-initiator represented by the general formula (I):

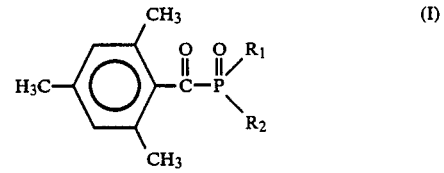

(wherein $R_1$ and $R_2$ which may be identical or different each represents a phenyl group, a methoxy group, an ethoxy group or an isopropyloxy group) and a casting polymerization molded product obtained by radical polymerization of said composition by irradiation with actinic ray.

8 Claims, No Drawings

ACTINIC RAY CURABLE COMPOSITION FOR CASTING POLYMERIZATION AND CASTING POLYMERIZATION MOLDED PRODUCTS

TECHNICAL FIELD

The present invention relates to a photo-curable composition for casting polymerization which rapidly cures by irradiation with actinic rays such as ultraviolet ray and more particularly it relates to a casting polymerization composition suitable for production of optical parts, optical lenses, optical discs, mechanical parts, electronic circuitries and the like which are molded by casting polymerization and molded products made from the composition.

BACKGROUND ART

Hitherto, photo-curable compositions comprising an oligomer (prepolymer) having (meth)acrylate terminal, a reactive monomer and a photopolymerization initiator have been widely used in the fields of paints, inks, coatings, electric materials, image formation, etc. because of the advantages that they cure in a short time at room temperature without using solvents which are harmful to the human bodies.

The oligomer which is a main component of these photo-curable compositions includes representatively urethane (meth)acrylate, epoxy (meth)acrylate and polyester (meth)acrylate. Especially, urethane (meth)acrylate is noticed as paints and coating materials because of its superior impact resistance, heat resistance and ductility. For example, it has been proposed to cure urethane (meth)acrylate obtained using xylylene diisocyanate with active energy ray to form a film suitable for printing plates or reliefs. (cf. U.S. Pat. No. 3,907,865).

Further, a method for obtaining molded products by cell casting polymerization has also been proposed with noticing the excellent properties of urethane (meth)acrylate in addition to paints and coating materials. For example, there have been proposed a method comprising mixing a hydroxy-containing monomer with a polyisocyanate to allow urethanation reaction and radical polymerization to proceed simultaneously, thereby obtaining a transparent molded product (U.S. Pat. No. 3,553,174) and a method according to which a high refraction plastic lens superior in heat resistance and impact resistance is obtained using urethane resin obtained by radical polymerization of a reaction product of xylylene diisocyanate with a hydroxyl group-containing unsaturated compound (U.S. Pat. No. 4,443,588).

However, uses of the photo-curable composition of U.S. Pat. No. 3,907,865 are limited to coating fields represented by coating and painting and thickness of the coating film is very thin such as several μm - several hundreds μm. This is due to the fact that the irradiated light is absorbed and scattered by photo-polymerization initiators, powder, etc. to prevent the light from reaching inside. Thus, compositions curable to a deep portion of several mm—several cm have not yet been found. In an attempt to improve the deep curability, use of heat catalysts such as azobisisobutyronitrile, benzoyl peroxide, etc. has been proposed. However, when the resulting cure molded products are used for optical and electrical uses, there occur yellowing, optical strain and stress strain and these are significant problems especially for use as optical parts.

The methods of U.S. Pat. Nos. 3,553,174 and 4,443,588 can afford plastic lenses superior in heat resistance and impact resistance, but require a long time of 20-50 hours for polymerization molding after pouring into lens mold and thus productivity is very low. Such casting polymerization methods which require long time have significant problems in production of lenses for glasses for which optical characteristics are important and which must be produced in a wide variety. Thus, methods higher in productivity have been demanded. Another problem is that the raw material urethane (meth)acrylate is solid or highly viscous liquid at room temperature and suffer from the problem of inferior operability in casting polymerization.

DISCLOSURE OF INVENTION

As a result of the inventors' intensive research on improvement of the above mentioned deep curability, optical strain, mechanical residual strain, yellowing, productivity, cast operability and the like, it has been found that these problems can be solved by using specific urethane (meth)acrylate, reactive diluent monomer and photopolymerization initiator. Thus, the present invention has been accomplished.

BEST MODE FOR CARRYING OUT THE INVENTION

That is, gist of the present invention is an actinic ray curable composition for casting polymerization comprising:

(A) an urethane poly(meth)acrylate having at least 2 (meth)acryloyl groups in one molecule,
(B) a radical polymerizable vinyl monomer having a boiling point of 100° C. or higher, and
(C) at least one member selected from methylphenyl glyoxylate, 2-hydroxy-2-methyl-1-phenylpropane-1-one, hydroxycyclohexyl phenyl ketone and a photo-polymerization initiator represented by the general formula (I):

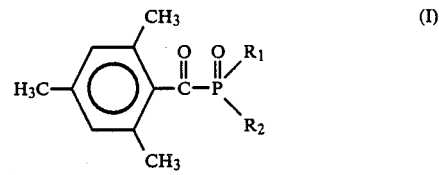

(wherein $R_1$ and $R_2$ which may be identical or different each denotes a phenyl group, a methoxy group, an ethoxy group or an isopropyloxy group), and a casting polymerization molded product obtained by radical polymerization of said composition with actinic rays.

The urethane poly(meth)acrylate (A) having at least two (meth)acryloyl groups in one molecule is a main component of the casting polymerization composition of the present invention and imparts good impact resistance, heat resistance, yellowing resistance and dyeability to the resulting molded products. This can be produced by addition reaction of a polyisocyanate compound and a hydroxyl group-containing (meth)acrylate.

As typical examples of the isocyanate compound having at least two isocyanate groups in the molecule, mention may be made of aliphatic, aromatic or alicyclic isocyanates such as tetramethylene diisocyanate, hexamethylene diisocyanate, trimethylhexamethylene diisocyanate, dimer acid diisocyanate, cyclohexane diisocyanate, isophorone diisocyanate, dicyclohexylmethane diisocyanate, m-tetramethylxylene diisocyanate, p-tetramethylxylene diisocyanate and the like. Further, there may also be used compounds having at least two isocyanate groups in the molecule obtained by reaction of these isocyanates with compounds having at least two active hydrogen atoms selected from the group consisting of amino group, hydroxyl group, carboxyl group, water, and the like or trimers—pentamers of the above diisocyanates.

Reduction in weather resistance and yellowing mainly due to heat treatment, irradiation with ultraviolet rays, etc. of these unsaturated group-containing urethane resins depend on structure of polyisocyanate compound constituting the urethane resins. When the polyisocyanate has aliphatic or alicyclic structure, weather resistance is relatively satisfactory, but when it has aromatic structure, yellowing is apt to occur. Furthermore, methylene hydrogen or methine hydrogen at α-position of urethane bond is readily eliminated, resulting in yellowing with time.

In addition, in case of optical materials, especially sufficient impact resistance cannot be obtained when using the above mentioned urethane (meth)acrylate (A).

This is due to the molecular structure which constitutes the urethane (meth)acrylate. In order to improve impact resistance, it is preferred to introduce soft structures such as ethylene glycol portion and propylene glycol portion into molecular structure, but when contents of recurring units of ethylene oxide and propylene oxide are more than 5 mol %, not only the hardness of molded product decreases, but also refractive index decreases. For improvement of these defects, it is preferably to introduce simultaneously soft portion and rigid portion into molecule. Specifically, it is considered to introduce bisphenol A skeleton, bisphenol S skeleton and bisphenol F skeleton.

Further, molecular weight is also important as a factor for improvement of impact resistance and this is improved with increase in molecular weight. In view of these facts, we have found that casting molded products superior in both the impact resistance and the heat resistance can be obtained by synthesis of urethane oligomers containing soft portion and rigid portion in the molecule which are represented by the formula (V).

$$CH_2=\overset{R_{10}}{\underset{|}{C}}-COO-(CH_2-\overset{R_{11}}{\underset{|}{CH}}O)_r-\overset{OH}{\underset{|}{CH}}-Y-\overset{H}{\underset{|}{N}}-\overset{O}{\underset{\|}{C}}-O-(\overset{R_{12}}{\underset{|}{CH}}CH_2O)_s- \quad (V)$$

$$-R_{13}-(O\overset{R_{12}}{\underset{|}{CH}}_2CH)_s-O\overset{OH}{\underset{|}{C}}N-Y-\overset{H}{\underset{|}{N}}-\overset{O}{\underset{\|}{C}}+O\overset{R_{11}}{\underset{|}{CH}}CH_2)_r-O\overset{O}{\underset{\|}{C}}-\overset{R_{10}}{\underset{|}{C}}=CH_2$$

lenses for glasses, high refractive index as the same level of ordinary inorganic glasses are desired, but aromatic structure must be introduced into polymer structures in order to increase refractive index.

For these reasons, the polyisocyanates used in the present invention are preferably those represented by the general formula (IV) which are less in yellowing.

$$OCN-\overset{CH_3}{\underset{CH_3}{\overset{|}{\underset{|}{C}}}}-Ar-\overset{CH_3}{\underset{CH_3}{\overset{|}{\underset{|}{C}}}}-NCO \quad (IV)$$

(wherein Ar denotes phenyl, biphenyl, naphthalene or diphenylmethane group). Among them, especially preferred are m-tetramethylxylene diisocyanate and p-tetramethylxylene diisocyanate.

As typical examples of the hydroxyl group-containing (meth)acrylates, mention may be made of 2-hydroxyethyl (meth)acrylate, 2-hydroxypropyl (meth)acrylate, 2-hydroxybutyl (meth)acrylate, 4-hydroxybutyl (meth)acrylate, addition reaction products of monoepoxy compounds such as butylglycidyl ether, 2-ethylhexylglycidyl ether, phenylglycidyl ether, glycidyl methacrylate and the like with (meth)acrylic acid, (meth)acrylic acid monoesters of polyethylene glycol or polypropylene glycol, etc.

Urethanation reaction of said hydroxyl group-containing (meth)acrylates and said isocyanates can be prepared by known method, for example, by dropwise addition of a mixture of the hydroxyl group-containing (meth)acrylate and a catalyst, e.g., dibutyl tin dilaurate in the presence of the isocyanate compound at 50°–90° C.

As performances required for casting molded products, impact resistance is important, but, in some case, (wherein $R_{10}$, $R_{11}$ and $R_{12}$ each denotes a hydrogen atom or a methyl group, r and s each denotes an integer of 1–5, $R_{13}$ denotes

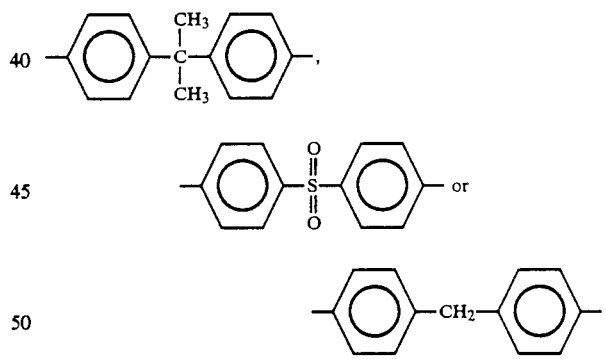

and Y denotes polyisocyanate.).

Urethane oligomers represented by the formula (V) can be synthesized by reacting the above polyisocyanate compound and hydroxyl group-containing (meth)acrylate at 1:1 and then reacting the reaction product with a diol of ethylene oxide or propylene oxide adduct of bisphenol A, a diol of ethylene oxide or propylene oxide adduct of bisphenol S or a diol of ethylene oxide or propylene oxide adduct of bisphenol F.

As those which improve both the heat resistance and the impact resistance, bisdiethoxy diol adduct of bisphenol S and bisdipropyloxy diol adduct of bisphenol A are suitable.

The radical polymerizable vinyl monomer (B) having a boiling point of at least 100° C. which is the second component in the present invention serves as a reactive diluent for urethane oligomer (A) containing (meth)acryloyl group in the molecule.

The casting polymerization composition desirably have a resin viscosity not exceeding 3000 to 5000 cps as the range where the compositions can be poured into a mold. However, in case of photo-curable compositions, it is possible to heat them to the acceptable range of temperature, for example, to about 100° C., thereby reducing the viscosity. In this case, the resin viscosity may exceed the above range at room temperature.

The radical polymerizable vinyl monomer (B) having a boiling point of 100° C. or higher is not critical and may be optionally chosen depending on the object. As examples thereof, mention may be made of mono(meth)acrylic compounds such as methyl methacrylate, ethyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, cyclohexyl (meth)acrylate, benzyl (meth)acrylate, phenyl (meth)acrylate, phenoxyethyl (meth)acrylate, phenoxypropyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, tetrahydrofurfuryl (meth)acrylate, phenylglycidyl (meth)acrylate, dimethylaminoethyl (meth)acrylate, phenylcellosolve (meth)acrylate, N-vinyl-2-pyrrolidone (meth)acrylate, dicyclopentenyl (meth)acrylate, biphenyl (meth)acrylate, 2-hydroxyethyl(meth)acryloyl phosphate and the like, vinyl compounds such as styrene, vinyltoluene, chlorostyrene, divinylbenzene, 1-vinylnaphthalene, 2-vinylnaphthalene and the like and polyfunctional (meth)acrylic compounds such as (meth)acryl glyceroyl methacrylate ethylene glycol di(meth)acrylate, diethylene glycol di(meth)acrylate, triethylene glycol di(meth)acrylate, tetraethylene glycol di(meth)acrylate, pentaethylene glycol di(meth)acrylate, nonaethylene glycol di(meth)acrylate, dipropylene glycol di(meth)acrylate, tetrapropylene glycol di(meth)acrylate, 1,3-butylene glycol di(meth)acrylate, 1,4-butanediol di(meth)acrylate, trimethylolpropane tri(meth)acrylate, neopentyl glycol diacrylate, 1,6-hexamethylene di(meth)acrylate, hydroxypivalic acid ester neopentyl glycol di(meth)acrylate, pentaerythritol tri(meth)acrylate, pentaerythritol tetra(meth)acrylate, dipentaerythritol penta(meth)acrylate, dipentaerythritol hexa(meth)acrylate, tris(meth)acryloxyethyl isocyanurate, 2,2'-bis(4-(meth)acryloxydiethoxyphenyl)-propane, 2,2'-bis(4-(meth)acryloxypentaethoxyphenyl)-propane, 2,2'-bis(4-(meth)acryloxyethoxy-3,5-dibromophenyl)propane, 2,2'-bis(4-(meth)acryloxydiethoxy-3,5-dibromophenyl)propane, 2,2'-bis(4-(meth)acryloxypentaethoxy-3,5-dibromophenyl)propane, 2,2'-bis(4-(meth)acryloxy-3,5-dibromophenyl)-propane, 2,2'-bis(4-(meth)acryloxyethoxy-3,5-dichlorophenyl)-propane, 2,2'-bis(4-(meth)acryloxyethoxy-3,5dimethylphenyl)propane, 2,2'-bis(4-(meth)acryloxydiethoxy-3,5-dichlorophenyl)propane, 2,2'-bis(4-(meth)acryloxydiethoxy-3,5-dimethylphenyl)propane, 2,2'-bis(4-(meth)acryloxy-3,5-dimethylphenyl)propane and the like.

Besides, allyl compounds such as diethylene glycol bisallyl carbonate, diallyl phthalate, dimethallyl phthalate, allyl methacrylate and the like may also be used.

These diluent monomers may be used alone or in combination of 2 or more.

As mentioned herebefore, it is necessary to improve operability for pouring and the material to be poured is preferably of low viscosity, low boiling point and low odor. Monomers having a boiling point of lower than 100° C., for example, methyl acrylate (boiling point: 78° C.) has strong odor and high toxicity and is not suitable for pouring operation and is not preferred.

Further preferable results can be obtained by using, alone or as a mixture, monomers represented by the following general formulas (II) and (III) as the radical polymerizable vinyl monomers (B) having a boiling point of 100° C. or higher.

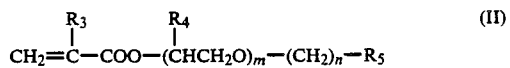

(wherein $R_3$ and $R_4$ each denotes a hydrogen atom or a methyl group, $R_5$ denotes a phenyl, biphenyl, cyclohexyl, dicyclopentadienyl or adamantyl group and m and n each denotes an integer of 0–3).

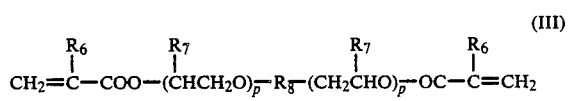

[wherein $R_6$ and $R_7$ each denotes a hydrogen atom or a methyl group, p denotes an integer of 0–5 and $R_8$ denotes

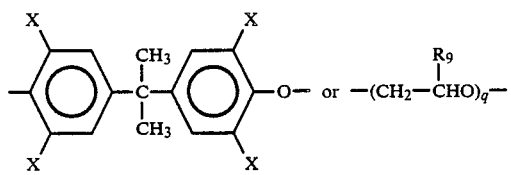

(wherein X denotes a hydrogen atom, a chlorine atom or a bromine atom, $R_9$ denotes a hydrogen atom or a methyl group and q denotes an integer of 0–5)].

Among the monomers (B) represented by the general formula (II), tetrahydrofurfuryl (meth)acrylate, cyclohexyl (meth)acrylate, benzyl (meth)acrylate, phenyl (meth)acrylate, phenoxyethyl (meth)acrylate, dicyclopentenyl (meth)acrylate and biphenyl (meth)acrylate are suitable considering dilution effect, hardness of molded product, refractive index and colorless transparency.

Among the monomers (B) represented by the general formula (III), the following are suitable in view of improvement in hardness and impact resistance of molded products: ethylene glycol di(meth)acrylate, diethylene glycol di(meth)acrylate, triethylene glycol di(meth)acrylate acrylate, tetraethylene glycol di(meth)acrylate, nonaethylene glycol di(meth)acrylate, pentaethylene glycol di(meth)acrylate, 1,3-butylene glycol di(meth)acrylate, dipropylene glycol di(meth)acrylate, tetrapropylene glycol di(meth)acrylate, 2,2'-bis(4-(meth)acryloxydiethoxyphenyl)propane, 2,2'-bis(4-(meth)acryloxypentaethoxyphenyl)propane, 2,2'-bis(4-(meth)acryloxyethoxy-3,5dibromophenyl)propane, 2,2'-bis(4-(meth)acryloxydiethoxy-3,5-dibromophenyl)propane and 2,2'-bis(4-(meth)acryloxypentaethoxy-3,5-dibromophenyl)propane.

More preferably, the above monofunctional monomer and polyfunctional monomer are used in combination for improvement of casting operability of the composition for casting polymerization and hardness, impact resistance, refractive index and colorless transparency of molded products.

The blending ratio is suitably 5–40 parts by weight of monofunctional monomer and 5–60 parts by weight of polyfunctional monomer for 40–90 parts by weight of urethane oligomer.

By mixing the third component (C) in the present invention, namely, at least one compound selected from methylphenyl glyoxylate, 2-hydroxy-2-methyl-1-phenylpropane-1-one, hydroxycyclohexylphenyl ketone and photo-polymerization initiator represented by the general formula (I):

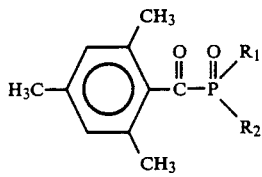

(wherein $R_1$ and $R_2$ each denotes a phenyl group, a methoxy group, an ethoxy group or an isopropyloxy group) with the above mentioned components (A) and (B), no yellowing occurs with actinic rays such as ultraviolet ray, the composition can be cured rapidly and good deep curability and surface hardness can be imparted to cured product.

As examples of the photo-initiators represented by the general formula (I), mention may be made of 2,4,6-trimethylbenzoyldiphenylphosphine oxide, 2,4,6-trimethylbenzoylphenyl-methoxyphosphine oxide, 2,4,6-trimethylbenzoylphenylethoxyphosphine oxide, 2,4,6-trimethylbenzoylphenylisopropyloxyphosphine oxide, 2,4,6-trimethylbenzoyldimethoxyphosphine oxide, 2,4,6-trimethylbenzoyldiisopropyloxyphosphine oxide, etc.

Acylalkylphosphine oxides represented by the general formula (I) among the photo-initiators in the present invention are sensitive to actinic rays in the range of wavelength of 370–390 nm, which is longer than 330–360 nm which is a wavelength range to which ordinary photo-initiators for ultraviolet rays are sensitive and hence they are especially excellent in deep curability. Among them, 2,4,6-trimethylbenzoyldiphenylphosphine oxide is most suitable considering its high storage stability and high molecule absorptivity coefficient.

Ultraviolet ray absorbers are often used in production of molded products by casting polymerization for improvement of weather resistance. In this case, also said 2,4,6-trimethylbenzoyldiphenylphosphine oxide is especially preferred because the ultraviolet ray absorbers and 2,4,6-trimethylbenzoyldiphenylphosphine oxide are different in wavelength to which they are sensitive and hence molding with inexpensive high pressure mercury lamps is possible.

In order to further increase reactivity, fusion lamp (V bulb) which has at least 50% of emission wavelength distribution intensity in 350–450 nm is preferred.

In practice of the present invention, it is preferred that 40–90% by weight of terminal (meth) acryloyl group-containing oligomer (A) which is the first component is blended with 10–60% by weight of reactive diluent monomer (B) having a boiling point of 100° C. or higher which is the second component and then, 0.005–5 parts by weight (per 100 parts by weight of component (A) + component (B)) of photo-initiator (C) which is the third component is mixed with the mixture of components (A) and (B).

In order to obtain a deep curability of 10 mm or more, it is especially preferred to add 0.005–0.5 part by weight of photo-initiator (C).

When an amount of the terminal (meth)acryloyl group-containing oligomer (A) is less than 40% by weight, activity to ultraviolet ray tends to decrease, causing reduction in hardness, wear resistance, heat resistance and impact resistance.

When an amount of the third component photoinitiator (C) is less than 0.005 part by weight, activity to actinic rays tends to decrease and even when it is added in an amount of more than 5 parts by weight, effect thereof cannot be expected so much and this is not preferred from the point of cost.

Ultraviolet rays of 2000–8000 Å in wavelength are preferred for polymerization curing of monomer mixture by irradiation with ultraviolet rays. Normal air atmosphere is sufficient as atmosphere for the irradiation.

Ordinary chemical lamp, xenon lamp, low pressure mercury lamp and high pressure mercury lamp can be used as a light source.

Furthermore, known methods of polymerization curing by irradiation with X-rays, electron rays, visible rays may also be used in addition to the above mentioned irradiation with ultraviolet rays.

Besides, as far as the effects of the present invention are not damaged, there may be added at polymerization step various ultraviolet curing monomers, oligomers and other copolymerizable monomers, non-reactive materials for prevention of shrinking, for example, polyethylene glycol, polypropylene glycol, polyethylene glycol monoalkyl ether, polypropylene glycol monoalkyl ether, ethylene oxide or propylene oxide adduct of bisphenol A, ethylene oxide or propylene oxide adduct of tetrabromobisphenol A, various peroxides, anti-yellowing agents such as triphenylphosphine, ultraviolet ray absorbers, blue ink dyes, etc.

EXAMPLES

The present invention is explained in more detail in the examples, wherein part is by weight.

Properties referred to in the examples were measured by the following methods.

(1) Depth of curing: Resin composition was poured into a polyethylene test tube of 8 mm in internal diameter, 10 mm in outer diameter and 50 mm in length covered with aluminum foil on side surface and bottom surface and then the tube was capped by a transparent polyester film. Thereafter, the tube was irradiated from above with ultraviolet ray emitted from a high pressure mercury lamp of 80 W/cm for about 30 seconds and cured product was taken out. Hardness of side portion of the product was measured by Shore D type hardness meter and depth of the portion having a hardness of 70 or more was measured.

Test piece used in the following items (2)–(8) was a plate of 2 mm or 10 mm (thickness) × 100 mm × 100 mm made by the following method: That is, resin composition was poured into a casting mold composed of two tempered glasses of 3 mm (thickness) × 150 mm × 150 mm and a gasket made of vinyl chloride. The composition was irradiated for 30 seconds through the glass of one side with ultraviolet ray emitted from 6 kw high pressure mercury lamp positioned at a distance of 10 cm from the mold (integrated light volume 3000 mj/cm²).

The composition molded was released from the glass mold and kept at 110° C. for 1 hour to remove internal strain of the molded product.

(2) Pencil hardness: Measured according to JIS-K 5400.

(3) Coloration: Y.I. (yellow index) of the cured product was measured according to JIS-K 7103.

(4) Transmittance of visible ray: Measured according to ASTM D1003-61.

(5) Refractive index: Measured with D-line of 589.3 nm by Abbe refractometer.

(6) Operability for pouring: This was evaluated by the degree of difficulty for pouring the monomer composition into the mold.

(7) Impact resistance: The test plate of 2 mm thick was subjected to falling ball test from height of 127 cm in accordance with FDA standard. The heaviest weight (g) of steel sphere by which the plate was not broken was measured.

(8) Heat resistance: Surface state (crack, distortion, etc.) and yellowing degree were visually evaluated after heat treatments of 85° C.×200 hr and 120° C.×5 hr.

Synthesis Example 1

Preparation of urethane dimethacrylate (UDM1)

244 Parts of m-tetramethylxylene diisocyanate and 0.3 part of hydroquinone monomethyl ether were charged in a three necked flask and thereto was added dropwise a mixture of 302 parts of 2-hydroxypropyl methacrylate and 0.3 part of n-butyl tin dilaurate over a period of 3 hours with stirring at 60° C. After completion of the addition, reaction was allowed to proceed for 8 hours at 70° C. to obtain urethane dimethacrylate UDM1.

Production of actinic ray curable composition

EXAMPLE 1

70 Parts of urethane dimethacrylate (UDM1) obtained in the above Synthesis Example 1 was mixed with 20 parts of benzyl methacrylate, 10 parts of pentaethylene glycol diacrylate and 0.05 part of 2,4,6-trimethylbenzoyldiphenylphosphine oxide and well stirred at room temperature. Then, this monomer mixture was poured into said polyethylene tube and glass mold for preparation of plate. The compositions in the polyethylene tube and the mold were irradiated from above or from side with UV ray by a 80 W/cm high pressure mercury lamp and the cured compositions were taken out. These cured compositions were measured on curing depth and surface hardness, pencil hardness, coloration, visible ray transmittance, impact resistance and heat resistance. Casting operability was evaluated at the time of pouring.

The results are as shown in Table 1. The cured products were colorless and transparent and had a surface hardness of 4H in pencil hardness and were also superior in other properties. Thus, they were satisfactory as optical materials.

Viscosity of the composition was low, namely, 500 cps at 25° C. and pouring operability was superior.

Further, the cured product was superior in properties such as impact resistance and did not yellow even after heat resistant test for 20 hours.

Synthesis Example 2

Preparation of urethane dimethacrylate (UDM2)

488 Parts of m-tetramethylxylene diisocyanate and 0.3 part of hydroquinone monomethyl ether were charged in a three necked flask and thereto was added dropwise a mixture of 295 parts of 2-hydroxypropyl methacrylate and 0.3 part of n-butyl tin dilaurate over a period of 3 hours at 60° C. with stirring. After completion of the addition, reaction was further allowed to proceed for 2 hours at 70° C., followed by cooling at 60° C. To the reaction mixture was added dropwise 426 parts of bis(diethoxyphenyl)sulfone over a period of 3 hours. After completion of the reaction, reaction was allowed to proceed for 5 hours at 70° C. to obtain urethane dimethacrylate (UDM2).

Production of actinic ray curable composition

Examples 2–18 and Comparative Examples 1–12

In the same manner as in Example 1, compositions were prepared using the components (A), (B) and (C) shown in Table 1 and properties of cured products were evaluated. The results are shown in Table 1.

Abbreviations of monomers in Table 1 stand for the following compounds.

UDM1: Urethane dimethacrylate obtained by reaction of m-tetramethylxylene diisocyanate with 2-hydroxypropyl methacrylate.

UDM2: Urethane dimethacrylate obtained by reaction of 2 mole of m-tetramethylxylene diisocyanate with 1 mol of bis(diethoxyphenyl)sulfone and 2 mols of 2-hydroxypropyl methacrylate.

UDM3: Urethane diacrylate obtained by reaction of dicyclohexylmethane diisocyanate with 2-hydroxypropyl acrylate.

UDM4: Urethane dimethacrylate obtained by reaction of 2 mols of dicyclohexylmethane diisocyanate with 1 mol of 2,2'-bis(diethoxyphenyl)propane and 2 mols of 2-hydroxyethyl methacrylate.

UDM5: Urethane diacrylate obtained by reaction of m-tetramethylxylene diisocyanate/p-tetramethylxylene diisocyanate =1/1 with 2-hydroxyethyl acrylate.

UDM6: urethane dimethacrylate obtained by reaction of 2,4,6-trimethylhexamethylene diisocyanate with 2-hydroxyethyl methacrylate.

UDM7: Urethane diacrylate obtained by reaction of an adduct trimer of 1,6-hexamethylene diisocyanate with 2-hydroxyethyl acrylate.

UDM8: Urethane dimethacrylate obtained by reaction of 2 mols of m-tetramethylxylene diisocyanate with 1 mol of 2,2'-bis(diethoxy 3,5-dibromophenyl)propane and 2 mols of 2-hydroxypropyl methacrylate.

UDM9: Urethane dimethacrylate obtained by reaction of xylylene diisocyanate with 2-hydroxypropyl methacrylate.

UDM10: Urethane diacrylate obtained by reaction of an adduct of 3 mols of tolylene diisocyanate and 1 mol of trimethylolpropane with 2-hydroxypropyl acrylate.

5EOA: Pentaethylene glycol diacrylate.
BzMA: Benzyl methacrylate.
THFM: Tetrahydrofurfuryl methacrylate.
PhOA: Phenoxyethyl acrylate.
BphM: Biphenyl methacrylate.
CHM: Cyclohexyl methacrylate.
MA: Methyl acrylate.
MMA: Methyl methacrylate.

DGB: Diethylene glycol bisallyl carbonate.
EDM: Ethylene glycol dimethacrylate.
B2EOA: 2,2'-Bis(4-acryloxydiethoxyphenyl)propane.
B5EOM: 2,2'-Bis(4-methacryloxypentaethoxyphenyl)propane.
TBM: 2,2'-Bis(4-methacryloxyethoxy-3,5-dibromophenyl)propane.
ST: Styrene.
Oi 1: 2,4,6-Trimethylbenzoyldiphenylphosphine oxide.
Oi 2: 2,4,6-Trimethylbenzoyl-p-phenyl-p-methoxyphosphine oxide.
Oi 3: 2-Hydroxy-2-methyl-1-phenylpropane-1-one.
Oi 4: Hydroxycyclohexylphenyl ketone.
Oi 5: Methylphenyl glyoxylate.
Oi 6: Acetophenone.
Oi 7: Diethoxyacetophenone.
Oi 8: Benzophenone.
Oi 9: 2-Methyl-[4-(methylthio)phenyl]-2-morpholino-1-propanone.
Oi 10: 2-Chlorothioxanthone.
Oi 11: Benzoinethyl ether.
Hi 1: Diisopropylperoxy percarbonate.
Hi 2: Azobisbutyronitrile.

TABLE 1

| Example | Component (A) | Component (B) | Component (C) | Depth of curing (cm) | Pencil hardness Front side | Pencil hardness Back side | Color | Visible ray transmittance (%) | Refractive index | Casting operability (Polymerization time) | Impact resistance | Color after heat resistance test |
|---|---|---|---|---|---|---|---|---|---|---|---|---|
| Example 1 | UDM1 (60) | BzMA (40) | Oi 1 (0.1) | 7 | 4H | 4H | Colorless | 91 | 1.54 | Excellent (1 min) | Excellent | Colorless |
| Example 2 | UDM1 (60) | BzMA (40) | Oi 1 (0.01) | 7 | 4H | 4H | Colorless | 90 | 1.54 | Excellent (1 min) | Excellent | Colorless |
| Example 3 | UDM1 (60) | BzMA (40) | Oi 2 (0.1) | 6 | 4H | 4H | Colorless | 90 | 1.54 | Excellent (1 min) | Excellent | Colorless |
| Example 4 | UDM1 (60) | BzMA (40) | Oi 3 (0.1) | 6 | 4H | 4H | Colorless | 90 | 1.54 | Excellent (1 min) | Excellent | Colorless |
| Example 5 | UDM1 (60) | BzMA (40) | Oi 4 (0.1) | 6 | 4H | 4H | Colorless | 91 | 1.54 | Excellent (1 min) | Excellent | Colorless |
| Example 6 | UDM1 (60) | BzMA (40) | Oi 5 (0.1) | 6 | 4H | 4H | Colorless | 90 | 1.54 | Excellent (1 min) | Excellent | Colorless |
| Example 7 | UDM1 (85) | BzMA (15) | Oi 1 (0.1) | 7 | 4H | 4H | Colorless | 90 | 1.53 | Excellent (1 min) | Excellent | Colorless |
| Example 8 | UDM1 (50) | BzMA (50) | Oi 1 (0.1) | 5 | 3H | 3H | Colorless | 90 | 1.53 | Excellent (1 min) | Good | Colorless |
| Example 9 | UDM5 (70) | 5EOA(20) ST(10) | Oi 1 (0.1) | 6 | 4H | 4H | Colorless | 91 | 1.53 | Excellent (1 min) | Excellent | Colorless |
| Example 10 | UDM1 (70) | TBM(30) | Oi 1 (0.1) | 7 | 4H | 4H | Colorless | 91 | 1.57 | Excellent (1 min) | Good | Colorless |
| Example 11 | UDM2 (40) | BMA(30) BphM(30) | Oi 1 (0.05) | 7 | 4H | 4H | Colorless | 90 | 1.57 | Excellent (1 min) | Excellent | Colorless |
| Example 12 | UDM1 (60) | B5EOM(30) BzMA(20) | Oi 1 (0.1) | 7 | 4H | 4H | Colorless | 90 | 1.54 | Excellent (1 min) | Excellent | Colorless |
| Example 13 | UDM1 (50) | THFM (30) | Oi 8 (0.1) | 4 | 3H | H | Colorless | 91 | 1.52 | Excellent (1 min) | Good | Slightly yellow |
| Example 14 | UDM3 (70) | 5EOA(10) BzMA(20) | Oi 1 (0.1) | 7 | 4H | 4H | Colorless | 90 | 1.52 | Excellent (1 min) | Excellent | Colorless |
| Example 15 | UDM4 (70) | B2EO4(30) | Oi 5 (0.1) | 7 | 4H | 4H | Colorless | 90 | 1.53 | Excellent (1 min) | Excellent | Colorless |
| Example 16 | UDM6 (50) | pHOA(20) EDM (40) | Oi 1 (0.1) | 7 | 4H | 4H | Colorless | 90 | 1.51 | Excellent (1 min) | Excellent | Colorless |
| Example 17 | UDM1(40) UDM7(30) | BzMA(30) | Oi 1 (0.1) | 7 | 4H | 4H | Colorless | 90 | 1.53 | Excellent (1 min) | Excellent | Colorless |
| Example 18 | UDM8 (60) | BphM (40) | Oi 1 (0.1) | 7 | 4H | 4H | Colorless | 90 | 1.56 | Excellent (1 min) | Excellent | Colorless |
| Comparative Example 1 | UDM1 (60) | BzMA (40) | Oi 6 (0.1) | 0.2 | B | B | Colorless | 90 | 1.52 | Excellent (1 min) | Poor | Yellow |
| Comparative Example 2 | UDM1 (60) | BzMA (40) | Oi 7 | 0.1 | B | B | Colorless | 90 | 1.52 | Excellent (1 min) | Poor | Yellow |
| Comparative Example 3 | UDM1 (60) | BzMA (40) | Oi 9 | 0.1 | H | B | Yellow | 85 | 1.53 | Excellent (1 min) | Poor | Yellow |
| Comparative Example 4 | UDM1 (60) | BzMA (40) | Oi 10 | 1.0 | 3H | 3H | Yellow | 80 | 1.54 | Excellent (1 min) | Good | Yellow |
| Comparative Example 5 | UDM1 (60) | BzMA (40) | Oi 11 | 0.3 | H | H | Slightly yellow | 87 | 1.53 | Excellent (1 min) | Poor | Yellow |
| Comparative Example 6 | PGB (100) | | Hi 1 (3) | — | 2H | 2H | Colorless | 91 | 1.50 | Excellent (20 hr) | Excellent | Colorless |
| Comparative | MMA | | Hi 2 | — | 2H | 2H | Colorless | 91 | 1.49 | Excellent | Good | Colorless |

TABLE 1-continued

| Example | Component (A) | Component (B) | Component (C) | Depth of curing (cm) | Pencil hardness Front side | Pencil hardness Back side | Color | Visible ray transmittance (%) | Refractive index | Casting operability (Polymerization time) | Impact resistance | Color after heat resistance test |
|---|---|---|---|---|---|---|---|---|---|---|---|---|
| Example 7 | UDM1 (100) | | (0.01) | 7 | 4H | 4H | Colorless | 90 | 1.53 | Good (8 hr) | Excellent | Distortion Colorless |
| Comparative Example 8 | UDM1 (100) | BzMA (70) | (0.1) | 3 | H | H | Colorless | 90 | 1.54 | Excellent (1 min) | Poor | Slightly yellow |
| Comparative Example 9 | UDM9 (30) | BzMA (40) | (0.1) | 7 | 4H | 4H | Colorless | 90 | 1.54 | Excellent (1 min) | Excellent | Slightly yellow |
| Comparative Example 10 | UDM10 (60) | BzMA (40) | (0.1) | 5 | 4H | 4H | Slightly yellow | 87 | 1.56 | Excellent (1 min) | Poor | Yellow |
| Comparative Example 11 | UDM1 (60) | MA (40) | (0.2) | 3 | 3H | 3H | Slightly yellow | 85 | 1.52 | Poor (1 min) | Poor | Yellow |

Industrial Applicability

The present invention provides actinic ray curable compositions for casting polymerization and a casting polymerization molded products which are superior in impact strength, heat resistance and optical characteristics and are markedly improved in coloration, optical strain and stress strain and which can be suitably used for optical and electrical uses.

We claim:

1. An actinic ray curable composition for casting polymerization which comprises:

(A) 40–90 parts by weight of an urethane poly(meth-)acrylate having at least two (meth)acryloyl groups in one molecule, obtained by addition reaction of a hydroxyl group-containing (meth)acrylate and a polyisocyanate represented by the general formula (IV)

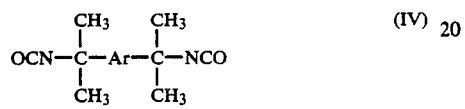

(wherein Ar represents a phenyl group, a biphenyl group, a naphthylene group or a diphenylmethane group), (B) 10–60 parts by weight of a radical polymerizable vinyl monomer having a boiling point of 100° C. or higher, being at least one monofunctional monomer selected from benzyl (meth)acrylate, phenyl (meth)acrylate, phenoxyethyl (meth)acrylate, biphenyl (meth) acrylate and cyclohexyl (meth)acrylate and/or at least one polyfunctional monomer selected from ethylene glycol di(meth)acrylate, diethylene glycol di(meth)acrylate, triethylene glycol di(meth)acrylate, tetraethylene glycol di(meth)acrylate, pentaethylene glycol di(meth)acrylate, 1,3-butylene glycol di(meth)acrylate, dipropylene glycol di(meth)acrylate, tetrapropylene glycol di(meth)acrylate, 2,2-bis(4-(meth)acryloxydiethoxyphenyl)propane, 2,2′-bis(4-(meth)acryloxydiethoxyphenyl)propane, 2,2′-bis(4-(meth)acryloxypentaethoxyphenyl)propane, 2,2′-bis(4-(meth)acryloxyethoxy-3,5-dibromophenyl)propane, 2,2′-bis(4-(meth)acryloxydiethoxy-3,5-dibromophenyl)propane and 2,2′-bis(4-(meth)acryloxypentaethoxy-3,5-dibromo-phenyl)propane, and (C) 0.01 to 0.1 parts by weight, per 100 parts by weight of total of the above components (A) and (B), of at least one member selected from methylphenyl glyoxylate, 2-hydroxy-2-methyl-1-phenylpropane-1-one, hydroxycyclohexyl phenyl ketone and a photo-initiator represented by the general formula (I):

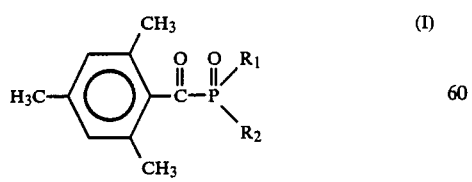

(wherein $R_1$ and $R_2$ which may be identical or different each represents a phenyl group, a methoxy group, an ethoxy group or an isopropyloxy group).

2. An actinic ray curable composition for casting polymerization according to claim 1 wherein the radical polymerizable vinyl monomer (B) represented by the general formula (II) is at least one selected from benzyl (meth)acrylate, phenyl (meth)acrylate, phenoxyethyl (meth)acrylate, biphenyl (meth)acrylate and cyclohexyl (meth)acrylate.

3. An actinic ray curable composition for casting polymerization according to claim 1 wherein the polyisocyanate represented by the general formula (IV) is at least one selected from m-tetramethylxylene diisocyanate and p-tetramethylxylene diisocyanate.

4. An actinic ray curable composition for casting polymerization according to claim 1 wherein the polymerization initiator (C) is 2,4,6-trimethylbenzoyldiphenylphosphine oxide and is used in an amount of 0.01–0.1 part by weight per 100 parts by weight of casting polymerization composition.

5. A casting polymerization molded product obtained by radical polymerization, with actinic ray, of an actinic ray curable composition for casting polymerization comprising:

(A) 40–90 parts by weight of an urethane poly-(meth-)acrylate having at least two (meth)acryloyl groups in one molecule obtained by addition reaction of a hydroxyl group-containing (meth)acrylate and a polyisocyanate represented by the general formula (IV)

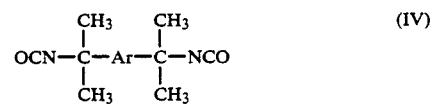

(wherein Ar represents a phenyl group, a biphenyl group, a naphthalene group or a diphenylmethane group), (B) 10–60 parts by weight of a radical polymerizable vinyl monomer having a boiling point of 100° C. or higher, being at least one monofunctional monomer selected from benzyl (meth)acrylate, phenyl (meth)acrylate, phenoxyethyl (meth)acrylate, biphenyl (meth) acrylate and cyclohexyl (meth)acrylate and/or at least one polyfunctional monomer selected from ethylene glycol di(meth)acrylate, diethylene glycol di(meth)acrylate, triethylene glycol di(meth)acrylate, tetraethylene glycol di(meth)acrylate, pentaethylene glycol di(meth)acrylate, 1,3-butylene glycol di(meth)acrylate, dipropylene glycol di,(meth)acrylate, tetrapropylene glycol di(meth)acrylate, 2,2′-bis(4-(meth)acryloxydiethoxyphenyl)propane, 2,2′-bis(4-(meth)acryloxypentaethoxyphenyl) propane, 2,2′-bis(4-(meth)acryloxyethoxy)-3,5-dibromophenyl)propane, 2,2′-bis(4-(meth)acryloxydiethoxy-3,5-dibromophenyl)propane and 2,2′-bis(4-(meth)acryloxypentaethoxy-3,5-dibromophenyl)propane, and (C) 0.01 to 0.1 parts by weight, per 100 parts by weight of total of the above components (A) and (B), of at least one member selected from methylphenyl glyoxylate, 2-hydroxy-2-methyl-1-phenylpropane-1-one, hydroxycyclohexyl phenyl ketone and a photo-initiator represented by the general formula (I):

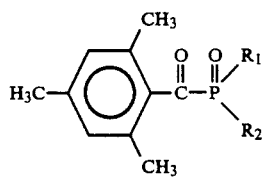
(I)

(wherein $R_1$ and $R_2$ which may be identical or different each represents a phenyl group, a methoxy group, an ethoxy group or an isopropyloxy group).

6. A casting polymerization molded product according to claim 5 wherein the radical polymerizable monomer (B) represented by the general formula (II) is at least one selected from benzyl (meth)acrylate, phenyl (meth)acrylate, phenoxyethyl (meth)acrylate, biphenyl (meth)acrylate and cyclohexyl (meth)acrylate.

7. A casting polymerization molded product according to claim 5 wherein the polyisocyanate represented by the general formula (IV) is at least one selected from m-tetramethylxylene diisocyanate and p-tetramethylxylene diisocyanate.

8. A casting polymerization molded product according to claim 5 wherein the polymerization initiator (C) is 2,4,6-trimethylbenzoyldiphenylphosphine oxide and is used in an amount of 0.01–0.1 part by weight per 100 parts by weight of casting polymerization composition.

* * * * *